May 27, 1952     C. H. DAVIES     2,598,231
AIRCRAFT GUN TURRET

Filed April 5, 1948     2 SHEETS—SHEET 1

Charles H. Davies
*INVENTOR.*

BY *James M. Clark*

HIS PATENT ATTORNEY

May 27, 1952      C. H. DAVIES      2,598,231
AIRCRAFT GUN TURRET

Filed April 5, 1948      2 SHEETS—SHEET 2

Charles H. Davies
*INVENTOR.*

BY *James M. Clark*

HIS PATENT ATTORNEY

Patented May 27, 1952

2,598,231

UNITED STATES PATENT OFFICE 2,598,231

AIRCRAFT GUN TURRET

Charles H. Davies, Seattle, Wash., assignor to Boeing Airplane Company, a corporation of Delaware Application April 5, 1948, Serial No. 18,919

17 Claims. (Cl. 89—37.5)

The present invention relates to ordnance for aircraft and more particularly to improved gun turret arrangements for pressurized aircraft.

The provision of gun turrets in pressurized aircraft for high altitude flight conditions has presented numerous problems, particularly from the standpoint of adequate sealing of the internal pressures, and the weight of and supports for the movable equipment. A prior effort to solve these problems contemplated the provision of an internally pressurized turret for shielding the gunner, guns and other accessories and resulted in a relatively heavy turret which necessitated a large diameter supporting ring upon which the turret rotated making it difficult to seal against loss of internal pressure. The fact that such turrets carried the gunner, guns and other equipment increased the problem of providing sufficient structural material in the turret, the supporting rings and the adjacent aircraft structure to prevent undue deflection of any of the parts and to insure proper sealing against pressure loss.

It has also been proposed to provide an individual pressurized cell for a gunner which could be rotated simultaneously with externally mounted guns in order that the gunner could sight this equipment through aiming movements in both the traversing and elevating direction. This arrangement also proved relatively heavy, presented a problem in connection with the independent pressurization of a separate cell, as distinguished from the main fuselage of the aircraft, and also had the effect of isolating the gunner from access to other positions within the fuselage. Other ordnance arrangements in pressurized aircraft have included the use of two separate stations including independent domes or projections, one to house the guns and the other for use as a separate sighting station for the use of the gunner or operator. Such guns are fired by remote control equipment and have not proven too satisfactory from the standpoint of the increased drag of the two separate projecting portions of the aircraft, the need for accurate sighting and aiming devices for the guns and the necessity of operating the guns remotely from a distance without the ability of the gunner being able to observe the condition of the gun from close range.

The present invention is directed to improvements in such gun turret arrangements for pressurized aircraft, and overcomes and eliminates the disadvantages and objections inherent in the arrangements heretofore proposed. The arrangement of the turret in the present invention provides for a gunner's station in which the fuselage is provided with an annular recess for the unpressurized ordnance equipment and the external wall of the aircraft fuselage, or other body, continued inside the gun recess or annulus to form a central core portion which projects beyond the adjacent surface of the body and terminates in a transparent dome portion between or adjacent to the guns. The annulus portion need not be pressurized, and the core portion, which is occupied by the gunner on a suitable rotatable gunner's seat to permit his following the aiming movements of his sighting equipment and the guns, is opened to the fuselage or body portion and is pressurized together with the remainder of the pressurized compartment of the aircraft.

In a modified form of the present invention, the ordnance equipment is connected to the gunner's seat by means of a vertical shaft which extends through the top of the sighting dome, at which a small diameter seal is provided, and the seat being connected to the external ordnance equipment to move therewith as a unit. These improved gun turret arrangements provide for a gunner's station which is pressurized by the main pressurization system of the aircraft, they permit the ordnance equipment to be disposed in an unpressurized space which is at the same time adjacent to and readily observed by the gunner, and they produce the pressure sealing problems to a minimum. The principal advantage of these improved arrangements resides in the ability of the gunner to sight directly in alignment with the gun, or guns, which may be operated by remote control equipment, and the difficult problem of sealing a movable gunner's compartment is not presented.

It is accordingly a major object of the present invention to provide improved gun turret arrangements for pressurized aircraft. It is a further object to provide a gun station in which the gunner is housed within a pressurized space open to the interior of the aircraft, and in which the guns and accessory equipment are disposed within adjacent unpressurized spaces. A further object of the present invention resides in providing an arrangement wherein the gunner may sight directly in alignment with the gun or guns and is in a closely adjacent position from which he can continually observe the operation and results of the gun and accessories.

It is a further important objective of the present invention to provide gun turret arrangements for pressurized aircraft in which the problems of sealing the relatively moving portions against loss of internal pressure are reduced to a minimum, or in fact eliminated completely. It is also an object of this invention to provide arrangements for aircraft gun turrets in which the weight of the rotating equipment and parts are reduced to a minimum, and in which arrangements the necessity for relatively heavy turret structures, supporting rings and adjacent aircraft structures are accordingly also reduced to a minimum to thereby improve the strength-to-weight ratio of these installations.

Other objects and advantages of the present invention will occur to those skilled in the art after reading the following description taken together with the accompanying drawings, in which.

Figure 2:
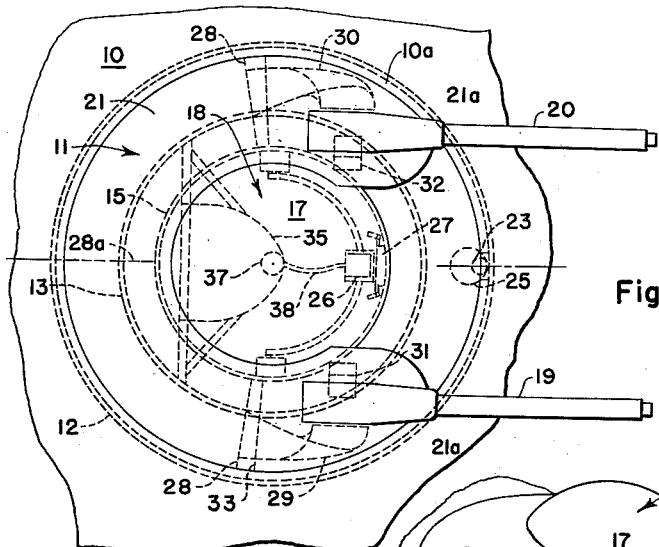
Fig. 2 is a plan view of the turret shown in Fig. 1.
Figure 3:
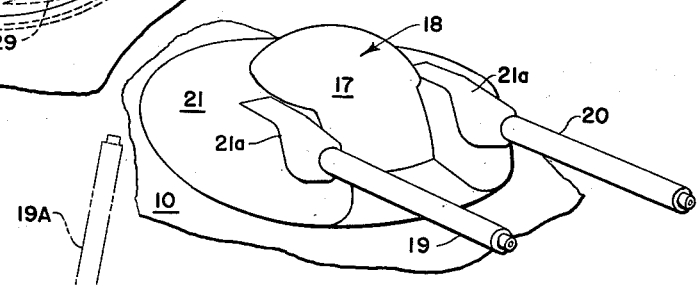
Fig. 3 is a perspective view looking down upon the exposed portion of the turret shown in Figs. 1 and 2.
Figure 1:
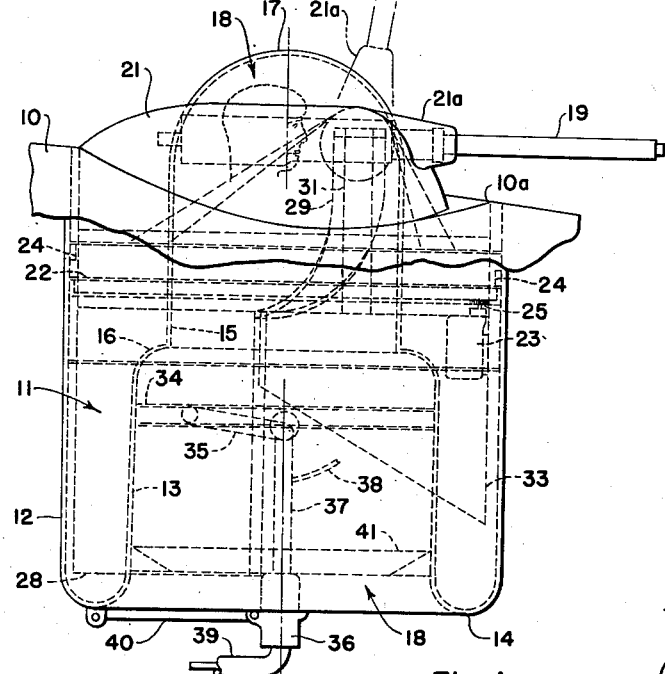
Fig. 1 is a side elevational view of an improved form of the gun turret of the present invention.
Figure 4:
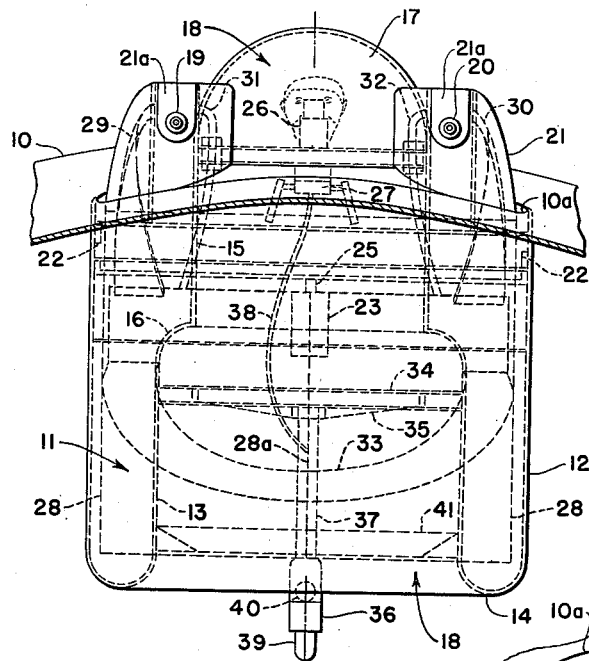
Fig. 4 is a front elevational view of the turret shown in the preceding figures.

Referring now to Figures 1 to 5 inclusive, and more particularly to the latter figure, the numeral 10 represents the outer wall of an aircraft fuselage or other portion of an airplane within which there is provided an annular or cylindrical well 11 defined by the outer cylindrical wall 12 which intersects the fuselage wall 10 along the coaming or curb 10a. The annular well 11 is internally defined by the lower inner cylindrical wall 13, which preferably joins the outer wall at the rounded bottom portion 14, and at its upper end it extends into an upper inner wall 15 of somewhat lesser diameter, but also of cylindrical shape, being provided with a rounded offset or shoulder at 16. The upper end of the inner wall 15 terminates in a rounded or in a semi-spherical transparent dome portion 17 which extends upwardly above the outer surface of the fuselage as defined by the interrupted wall portion 10. It will be noted from the configurations of the walls shown in Fig. 5 that the normal fuselage outer wall 10 is interrupted to provide an outer annulus 11 which is open at its outer end to the atmosphere, is closed at its lower end by the rounded portion 14 and is bounded on its inner side by the wall portions 13, 15, 16 and 17 which latter walls define a cylindrical internal chamber which is opened at its lower end to the interior of the fuselage and is closed at its outer end against the loss of internal fuselage pressure indicated by the plus signs (+), by the semi-spherical dome 17, at its upper or outer end. The reduced pressures prevailing on the outer side of the fuselage 10, within the annulus 11 and on the outside of the dome 17 are indicated by the minus signs (—).

Referring more particularly to Figs. 1 to 4 inclusive, it will be seen that the configuration of the interrupted fuselage wall 10 described above in connection with Fig. 5, provide a gun station for pressurized aircraft in which the guns, ammunition and other accessories are carried within and above the annular space 11 and the gunner is housed within the internal chamber 18 which is pressurized from and accessible to the interior of the fuselage. In these figures, the twin guns are indicated by the numerals 19 and 20 and the upper portion of the gun-containing annulus is provided with a gun fairing 21 to reduce the drag of the gun turret portion which projects beyond the surface of the fuselage wall 10. It will be understood that the gun turret or fairing 21 is rotatable about the vertical axis of the installation as the guns are trained in azimuth and that fairing portions 21a are provided to permit the elevation of the guns without movement of the main turret 21. The guns and their external accessory equipment are supported within the annular well 11 from the circular azimuth ring 22 upon the cylindrical outer well wall 12. The guns and external accessory equipment are driven in azimuth or rotated about the vertical axis of the installation by the azimuth drive motor 23 through the drive gearing 25, the rotative assembly running upon the rollers 24 disposed within the azimuth ring or track 22. The gun station is provided with a sighting installation 26, and an aiming and firing control 27 for the operation of the guns, this sighting, aiming and fire control equipment being disposed within the internal pressurized chamber 18 and may be connected to the guns in the same manner in which remote control gun installations are connected. The details of such remote control turret systems are shown and described in "Central-Station Fire Control System Fundamentals," GES-3204, and "Central-Station Fire-Control System Electrical Operation," GES-3211 of the General Electric Company.

The gun installation is provided with a double ammunition box or container 28 for the storage of belted ammunition for the guns, the container being U-shaped or semi-cylindrical, extending around the rear half of the annular space 11 and being divided along the center line along the partition 28a as shown in Fig. 2. The ammunition is fed from the container portions 28 by the ammunition feed chutes 29 and 30 to the respective guns 19 and 20 and the ejected clips, or spent ammunition parts, are ejected into the discharge chutes 31 and 32 from which they fall into the hopper or container 33 for the spent ammunition. It will also be understood that suitable remote control drive mechanism is provided for elevating the guns into the position indicated by the dotted lines 19A in Fig. 1, this drive mechanism being of the well known type and is not shown in the drawings.

Within the internal pressurized chamber 18, there is provided a seat ring or track 34 supported upon the lower inner wall 13 and accommodating a hinged seat 35 for use by the gunner. On the axial centerline of the installation and beneath the rounded wall portion, there is provided a collector assembly 36 through which the several electrical, pneumatic, hydraulic or other service leads necessary for the gun installation, the operation of the guns or for the use and comfort of the gunner, pass from the source of supply to the rotating portion of the gun installation. The collector assembly 36 is rotatively coupled at its upper portion to the collector column 37 from which the gun control leads 38 extend upwardly to the sighting, aiming and fire control equipment 26 and 27 and the assembly 36 is connected at its lower portion to the flexible power leads and other services 39. An anti-rotation or anti-torque arm 40 is rigidly attached at its outer terminal to the rounded wall portion 14 and at its inner terminal to the connector assembly 36 to hold the latter rigidly in its centralized position and to prevent its rotation with the gunner's seat 35 and the collector column 39. An angularly disposed footrest ring 41 is attached to the lower inner wall 13 upon which the gunner may place his feet and by means of which he can manually rotate the seat to follow the power driven rotation of the external gun installation.

Figure 6:
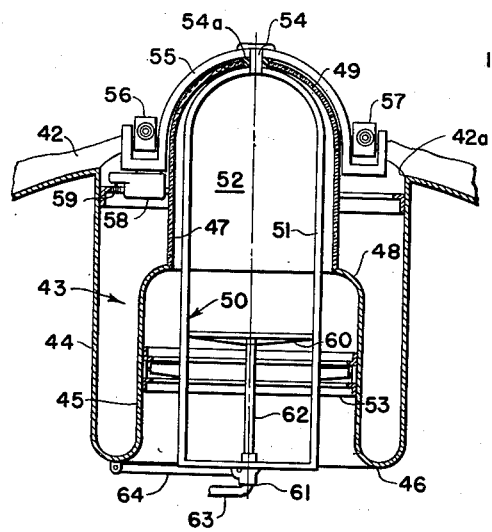
Fig. 6 is a front sectional view of a modification of the present turret invention.
Figure 5:
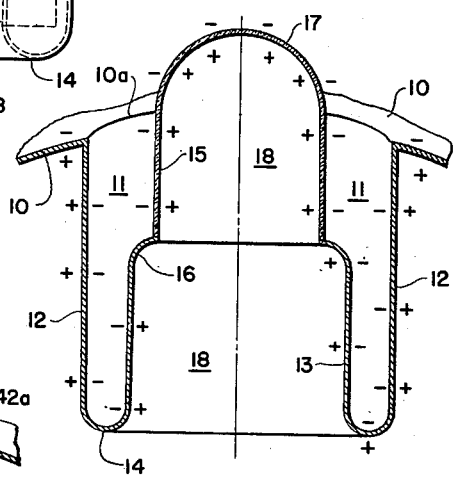
Fig. 5 is a sectional diagrammatic view of the same turret indicating the pressurized and unpressurized spaces.

Referring now to Fig. 6, there is shown a modification of the foregoing turret arrangement for installation in a substantially similar external wall configuration of the fuselage, but in which the internal gunner support and the external guns and accessory equipment are physically interconnected through a short shaft at the top of the dome portion, by which they are power-rotated together in azimuth. In this modification, the numeral 42 represents the fuselage wall which is interrupted to provide the annular well 43, externally defined by the outer cylindrical wall 44 and the coaming 42a, and inwardly terminated by the inner wall 45, the rounded bottom 46, the upper wall 47, the offset portion 48 and the transparent dome portion 49.

A gunner compartment frame-work or cage 51 is co-axially disposed within the internally pressurized chamber 52 and forms the major component of the rotatable assembly 50, which is rotatively supported on the azimuth ring or track 53. The latter is supported upon the lower inner wall 45 and the upper dome portion 49 is suitably reinforced to provide a sealed bearing 54a for the vertical shaft 54 at the top of the dome portion. This bearing 54a is provided with a pressure seal to prevent loss of internal pressure outwardly through the dome portion, and the shaft 54 rigidly interconnects the top of the gunner cage 51 with a gun bridle or yoke member 55. This inverted U-shaped yoke member supports at its outer lower extremities the twin guns 56 and 57, which are preferably symmetrically disposed and which are accordingly rotated in azimuth in synchronism with the gunner's compartment assembly 50. This azimuthal rotation is imparted to the movable assembly by means of the azimuth motor 58 driving the gearing 59. The gun sighting, aiming, fire control and ammunition accessories are substantially identical with those described in conjunction with the earlier modification and have not been shown in detail in this figure.

Within the pressurized gunner chamber 52 and mounted upon the cage or framework 51, is a similar gunner seat 60, a collector assembly 61, a collector column 62, the flexible lead or service connection at 63, and a similar anti-rotation arm 64. It will, accordingly, be noted that the modification in Fig. 6 is generally similar to that shown in Figs. 1 to 5 inclusive, and that the major difference resides in the direct co-axial connection between the external gun rotative assembly and the internal gunner assembly by means of the short vertical shaft 54. The equipment may otherwise be dependingly installed in a like annular well of substantially the same shape, and derives similar advantageous results in that a single turret or protuberance is caused to be exposed beyond the streamlined outer surface of the aircraft body, the gunner is disposed between and proximate to the twin guns and is in an automatically pressurized and readily accessible space with respect to the main compartment within the fuselage. The modification of Fig. 6 requires a rotating pressure seal at the bearing 54a, which, however, is of relatively small diameter as compared to the large diameter supporting rings or circular tracks which have heretofore been required to be sealed in prior installations. This modification also requires that a cage framework be provided, that the transparent dome be suitably reinforced structurally to provide an adequate support for the bearing 54a and the shaft 54, which supports the weight of the movable gun assembly. This modification also requires the exposure of the yoke 55 to the airstream. It will, of course, be understood that the pressure conditions described in conjunction with Fig. 5 apply equally to both of these modifications and while the two forms of this invention which have been disclosed and described have been selected for explanatory purposes as applying to a vertically disposed gun turret installation, it will be understood that it is equally applicable to installations in other than the roof or deck of an aircraft fuselage and at angles of its central axis disposed at other than the vertical disposition which has been shown herein.

Other forms and modifications of the present invention, both with respect to its general arrangement and the details of its respective parts, which may become obvious to those skilled in the art after reading the present description, are intended to come within the scope and spirit of this invention as more fully set forth in the appended claims.

I claim:

1. In aircraft, an ordinance position comprising a pressure-tight wall of the aircraft having an annular inwardly protruding peripheral recess formed therein, said peripheral recess opening externally and arranged to house ordnance and ordnance accessories, and a central chamber formed by said wall within said annular recess portion opening internally into a pressurized interior of the aircraft arranged for occupancy by a gunner, said aircraft wall extending internally of said annular peripheral recess and externally of said central chamber.

2. An aircraft gun position including a pressure-tight aircraft wall enveloping a pressurized interior space, said wall having an annular peripheral depression formed therein with its inwardly protruding portion extending into said pressure-tight space, a central annular portion of said arcraft wall protruding outwardly from said interior space substantially axially of said annularly depressed peripheral portion, the outer terminal of said central portion being closed to the external atmosphere by said enveloping pressure-tight wall arranged to provide for the housing of a gunner therein, said enveloping wall being fixed with respect to the aircraft, and a faired enclosure for an aircraft gun movably mounted within said annular depression outside of said internally pressurized space.

3. In a pressurized aircraft fuselage, a pressure-tight wall enclosing said fuselage, said wall having an annular recessed peripheral portion open externally only to the atmosphere, said wall having a central portion extending beyond the normal main exterior surface of said wall open internally only to the interior of said fuselage, means for operatively supporting movable ordnance devices within said annular peripheral recess, and further means for housing an operator within said fixed pressurized central portion for the operation of said ordnance devices by said operator.

4. A gun turret installation for an aircraft including an external pressure-tight wall enclosing a pressurized interior space within said aircraft, an annular well portion peripherally formed within said external wall having spaced cylindrical peripheral and central concentric wall portions continuous and interconnected at their inwardly extending portions, said peripheral well opening externally of the aircraft at its outer portion, the central portion of said wall being formed with a central dome portion protruding externally beyond the normal outer surface of said external wall, said external wall portions being fixed and continuous for providing a pressure-tight relationship, ordnance devices operatively carried within said annular peripheral well, rotatably mounted fairing means for enclosing said ordnance devices within said well, and means associated with said pressurized central dome portion for housing an operator for said ordnance devices.

5. In aircraft, a gun turret installation comprising a main annular peripheral portion housing relatively movable components arranged for traversing and elevating movements, a pressure-tight continuous wall fixed with respect to the aircraft defining the form of said annular peripheral portion, said fixed wall forming a central outwardly projecting transparent portion concentrically of said peripheral portion arranged for occupancy by the head portion of a gunner for the operation of said movable components in said annular peripheral portion.

6. In an aircraft gun turret installation formed within an external wall of a pressurized internal space, an annular depressed peripheral portion of said external wall enclosed in a pressure-tight relationship at the inner end of said annular depressed peripheral portion forming a well, the said annular peripheral well terminating externally in a faired turret member arranged to house ordnance equipment, the central cylindrical wall portion of said annular peripheral well extending outwardly of said aircraft wall terminating in an internally pressure-tight fixed transparent portion arranged to accommodate sighting and control equipment for said ordnance devices housed within said peripheral well.

7. In an aircraft gun turret installation a pressurized compartment of the aircraft enclosed by a pressure-tight wall, an inwardly depressed annular peripheral portion of said wall closed at its inner portion and open externally to the normal outer surface of said aircraft wall forming an unpressurized annular peripheral space, a central gunner position formed by a concentric continuation of said wall co-axially within said annular peripheral portion terminating outwardly in a pressure-tight dome portion of said wall arranged to provide an internally pressurized non-rotatable compartment for a gunner, rotatable support means extending outwardly through said central dome portion, and ordnance devices supported from said rotatable means and disposed within said annular peripheral space.

8. In an aircraft gun turret installation, a pressurized compartment of the aircraft enclosed at its top portion by a substantially horizontal pressure-tight wall, an inwardly depressed annular peripheral portion of said wall projecting into said compartment and closed at its bottom portion, said peripheral portion opening outwardly of said fixed aircraft wall, a concentric gunner position centrally formed within said annular peripheral portion terminating outwardly and upwardly in a pressure-tight fixed dome portion arranged to define a pressurized compartment for a gunner, rotatable means extending through said dome portion for the support and operation of ordnance devices supported from said rotatable means within said unpressurized annular peripheral portion and a rotatable turret fairing enveloping said ordnance devices.

9. In aircraft having a pressure-tight fuselage wall enveloping a pressure-tight interior space, a gun turret installation comprising an annular peripheral portion formed by said fuselage wall having relatively movable gun components arranged for traversing and elevating movements housed therein, a central outwardly projecting portion formed by said fuselage wall arranged for occupancy by a gunner for the operation of said movable gun components within said annular peripheral portion, said central portion being open to said pressure-tight interior space, said presure-tight wall being continuous and fixed with respect to the aircraft for defining the inner limits of said annular peripheral gun housing portion and the outer limits of said central gunner portion.

10. In aircraft, a gun turret installation for the upper deck of the fuselage of the aircraft said gun turret installation having relatively movable components arranged for traversing and elevating movements, said gun turret installation comprising an inwardly protruding annular gun portion, a relatively fixed pressure-tight continuous wall defining the inner and lower limits of said annular gun portion, said fixed wall terminating in a central outwardly and upwardly projecting transparent portion arranged for occupancy by a gunner for the operation of said movable components in said gun portion, and fairing means rotatably supported upon said fixed wall for externally fairing said gun portion and its relatively movable components.

11. In aircraft, a fuselage compartment having a substantially horizontal upper wall, a fixed gunner compartment in said upper wall comprising a central cylindrical portion enclosed by an upper outer dome portion, and an annular gun turret rotatably mounted concentrically around said gunner compartment within an annular depressed portion of said fuselage wall, said fuselage wall being fixed and continuous and extending internally of said peripheral gun turret and externally of said central gunner compartment.

12. In an aircraft gun turret installation a pressurized compartment of the aircraft enclosed by a fixed pressure-tight wall, said wall having a horizontal deck portion defining the roof of said compartment, an inwardly depressed annular portion of said deck wall closed at its inner lower periphery and opening upwardly and outwardly of the normal extended outer surface of said aircraft deck wall forming an unpressurized annular peripheral space, a central gunner position formed by a concentric cylindrical continuation of said fixed wall centrally of said annular space terminating upwardly and outwardly in a pressure-tight dome portion of said fixed wall arranged to provide a pressurized compartment for a gunner, rotatable support means extending outwardly through said dome portion, and ordnance devices supported from said rotatable means and disposed within said unpressurized annular peripheral space.

13. In a pressure-tight aircraft external wall, a fixed central internally pressurized gunner compartment, said compartment including a transparent dome portion extending beyond the normal projected outer surface of said aircraft wall, an annular gun carrying turret mounted for rotation concentrically about said fixed gunner compartment in a depressed peripheral portion formed by said pressure-tight wall, said gun turret provided with an external fairing of general U-shape extending outwardly of the projected surface of said aircraft wall, ordnance means movably mounted with respect to said rotatable gun turret and its external fairing arranged in such manner that an occupant of said pressurized gunner compartment can see through said transparent dome portion targets upon which said ordnance devices in said unpressurized peripheral portion are trained.

14. In aircraft turret construction, an enclosing pressure-tight wall for an internally pressurized space, an annular peripheral well formed by an inwardly depressed portion of said enclosing wall extending into said pressurized space, a cylindrical protuberance portion formed by an outwardly extending portion of said pressure-tight enclosing wall extending outwardly from said pressurized space and disposed centrally with respect to said annular well, said annular well arranged to accommodate a movable unpressurized gun turret, said central protuberance arranged to accommodate an operator for said gun turret, said operator protuberance being open internally to said interior pressurized space, the said enclosing wall extending in a fixed and uninterrupted pressure-tight manner internally of said unpressurized annular well gun turret portion and externally of said central pressurized gunner protuberance portion with said turret portion sealed in a pressure-tight manner from the said gunner portion and said internally pressurized space.

15. In an aircraft having a pressure-tight wall defining an internally pressurized space within the aircraft, a gun position disposed at the normal streamlined surface of said aircraft wall comprising an annular depressed concave portion for housing ordnance means on the outside of said wall and a central convex portion as viewed from the exterior of said wall, said convex portion being centrally and concentrically disposed with respect to said annular peripheral portion and projecting exteriorly of the normal extended streamlined surface of said wall for defining an internal gunner space accessible from and pressurized with said interior pressurized space.

16. In an aircraft having an exterior pressure-tight wall extending in a substantially horizontal direction and defining the upper wall of an interiorly pressurized space, said wall formed to provide a depressed annular portion projecting downwardly beneath the extended horizontal surface of said wall to provide an ordnance well, said annular depressed portion having a central cylindrical portion of said pressure-tight wall extending outwardly from the bottom of said ordnance well to project above the extended horizontal surface of said wall with its upper end sealed in a pressure-tight arrangement to provide a central compartment for a gunner, the said pressure-tight wall extending inwardly around and beneath said ordnance well and upwardly and outwardly around said gunner compartment to maintain said aircraft interior and said gunner compartment in a pressure-tight condition for preserving said interior pressurization.

17. In an aircraft having an exterior pressure-tight enclosing wall forming an internally pressurized compartment, a gun position for disposition partially outside the said exterior wall of said compartment including an annular peripheral internally depressed portion formed by said wall open externally and arranged to define a gun position to house an ordnance device, and an internally open pressurized annular gunner compartment formed by a continuation of said pressure-tight wall centrally disposed within said annular depressed peripheral wall portion, said central gunner compartment open toward the interior of said pressurized compartment arranged to be occupied by a gunner for sighting and firing said ordnance device from said portion disposed outside said exterior wall.

CHARLES H. DAVIES.

REFERENCES CITED

The following references are of record in the file of this patent:

UNITED STATES PATENTS

| Number | Name | Date |
| --- | --- | --- |
| 2,029,692 | Zindel | Feb. 4, 1936 |
| 2,258,939 | Poche | Oct. 14, 1941 |
| 2,364,425 | Corte | Dec. 5, 1944 |
| 2,373,185 | Hurley | Apr. 10, 1945 |
| 2,388,873 | Schwab | Nov. 13, 1945 |

FOREIGN PATENTS

| Number | Country | Date |
| --- | --- | --- |
| 573,557 | Great Britain | Nov. 1, 1945 |